United States Patent [19]

Heier et al.

[11] Patent Number: 5,285,397
[45] Date of Patent: Feb. 8, 1994

[54] COORDINATE-MEASURING MACHINE FOR NON-CONTACT MEASUREMENT OF OBJECTS

[75] Inventors: Helmut Heier; Klaus-Peter Koch, both of Aalen; Karl-Hermann Breyer, Heidenheim, all of Fed. Rep. of Germany

[73] Assignee: Carl-Zeiss-Stiftung, Oberkochen

[21] Appl. No.: 616,627

[22] Filed: Nov. 21, 1990

[30] Foreign Application Priority Data

Dec. 13, 1989 [DE] Fed. Rep. of Germany ....... 3941144

[51] Int. Cl.⁵ .............................................. G01B 11/03
[52] U.S. Cl. .................................... 364/559; 364/525; 364/560; 364/713; 356/1; 356/375; 382/8; 382/28; 382/62; 382/68; 367/907; 33/503; 33/504; 348/92; 348/94; 348/136; 348/139
[58] Field of Search ............... 364/559, 525, 560, 713; 358/107, 108, 106, 109; 33/503, 504; 356/1, 375; 367/907; 340/712

[56] References Cited

U.S. PATENT DOCUMENTS

| | | | |
|---|---|---|---|
| 4,396,945 | 8/1983 | DiMatteo et al. | 358/107 |
| 4,724,480 | 2/1988 | Hecker et al. | 358/107 |
| 4,796,200 | 1/1989 | Pryor | 364/513 |
| 4,888,877 | 12/1989 | Enderle et al. | 33/503 |
| 4,928,175 | 5/1990 | Haggrén | 358/108 |
| 4,953,306 | 9/1990 | Weckenmann et al. | 33/503 |
| 4,982,438 | 1/1991 | Usami et al. | 382/25 |
| 4,993,836 | 2/1991 | Furuhashi et al. | 358/107 |
| 5,042,162 | 8/1991 | Helms | 33/503 |
| 5,050,112 | 9/1991 | Hedglen et al. | 364/560 |

FOREIGN PATENT DOCUMENTS

3812590 11/1988 Fed. Rep. of Germany ......... G02B 27/18

OTHER PUBLICATIONS

Ealing Optics Catalogue, The Ealing Corporation No month 1984 pp. 9, 26–27, 32–33, 39–44.
Feinwerktechnik & Messtechnik 96 (1988) Jun. 6, 1988 pp. 253–257.
VDI Berichte No. 711,1988, pp. 139–151.

Primary Examiner—Jack B. Harvey
Assistant Examiner—Hal D. Wachsman
Attorney, Agent, or Firm—Hopgood, Calimafde, Kalil, Blaustein & Judlowe

[57] ABSTRACT

A plurality of video cameras (7a–d) are mounted on a table which is adapted support a workpiece or other object to be measured, and the mounting of each camera to the table provides for controlled universal orientation of each camera via an articulating head having provision for selective rotation about each of two orthogonally related axes. The table is provided with vibration damping, whereby both the measured object, and the cameras which provide triangulation data for each measurement, can operate from the same rigid base, isolated from external sources of mechanical shock. The video signals of the cameras are fed, along with instantaneous optical-axis orientation data for each camera, to the computer of a coordinate-measuring machine. The computer relies upon stored calibration data and angular-position data sensed about each of the rotary axes of the articulating heads to derive the orientation data; and the computer additionally relies on video-image analysis to calculate the coordinates of each measured point on the object.

25 Claims, 4 Drawing Sheets

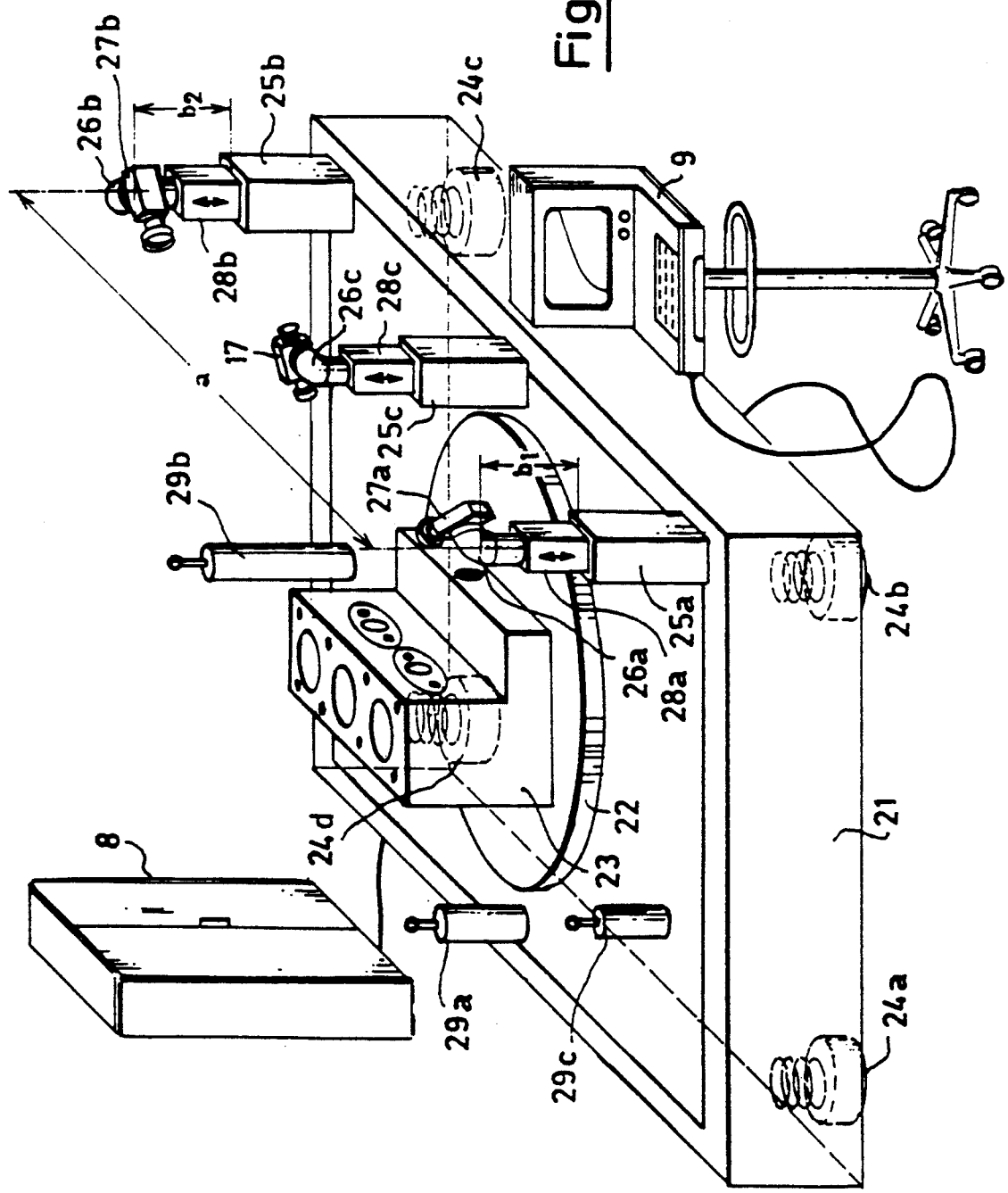

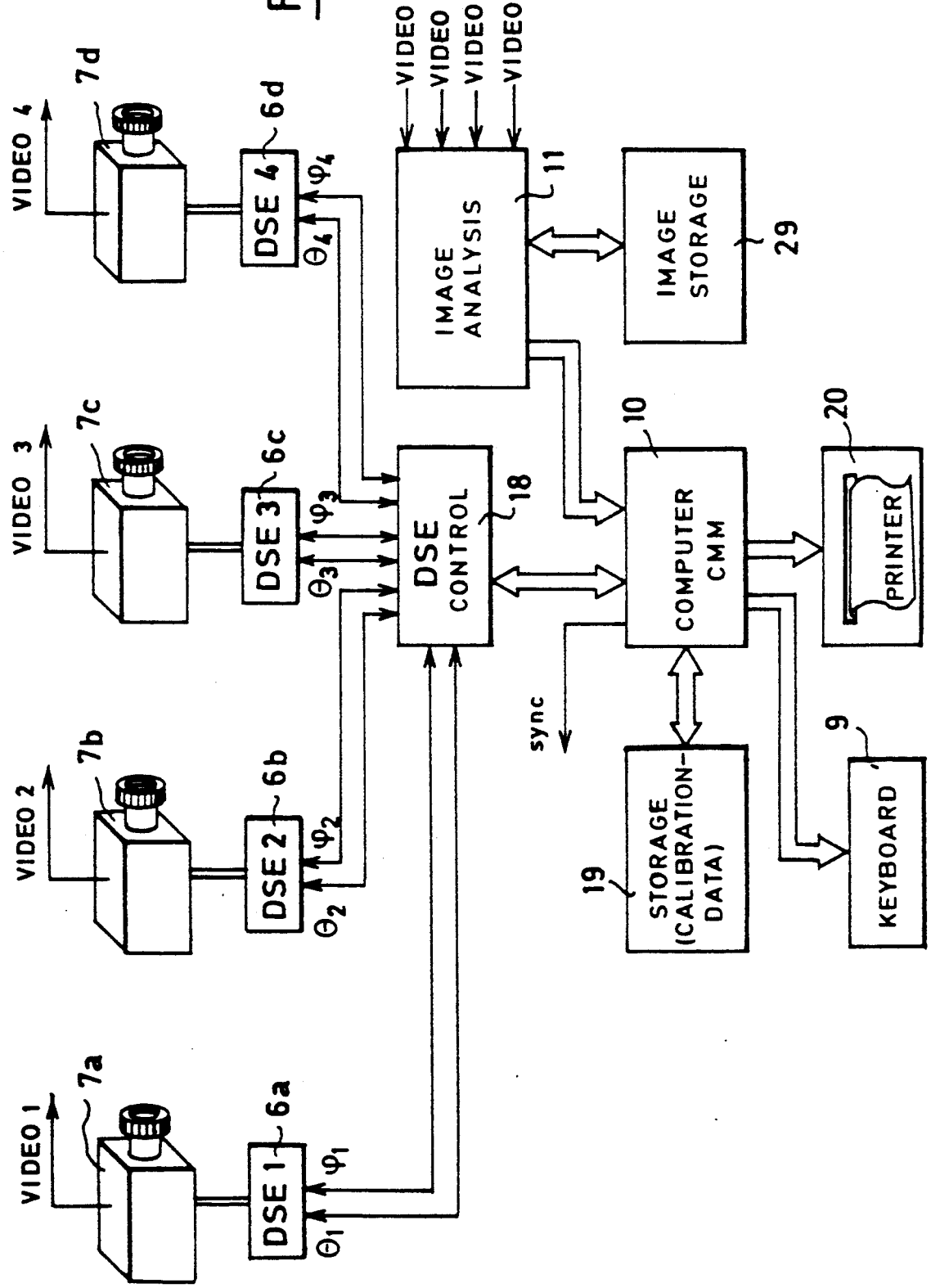

COORDINATE-MEASURING MACHINE FOR NON-CONTACT MEASUREMENT OF OBJECTS

BACKGROUND OF THE INVENTION

Coordinate-measuring machines (CMM) of various construction are known for the tactile measurement of objects. All of these machines have a measurement arm which can be positioned in three directions in space, and the end of the measurement arm carries a probe head with a probe which mechanically contacts the object or workpiece to be measured.

These machines are poorly suited for uses in which very large workpieces must be measured or in which a great density of points is required, since for each measurement point the probe must be moved into contact with the workpiece, resulting in relatively long measurement times.

It has, therefore, also already been proposed to measure such objects optically by three-dimensional triangulating intersection from at least two points, as for example, by means of two theodolites.

However, no significant reduction in measurement time can be obtained with simple manually operated optical systems of this kind, since each measurement point must also be targeted directly by the operator, using both optical sighting devices.

It has, therefore, already been proposed to motorize the axes of the theodolites and to include electronic sensors in the form of CCD* cameras in the ray path of the observation telescope of each theodolite; the CCD cameras produce images which are then automatically evaluated in an associated image-processing unit. One such measurement system is described in VDI Berichten No. 711, 1988, pages 139-151.

*CCD is the accepted abbreviation for "charge coupled device".

However, the known system is very cumbersome and expensive since it contains a large number of components that are unnecessary in a system for measuring industrial objects, since the theodolites used are special instruments for geodesy and contain, for example, compensators, leveling devices, mechanical coarse/fine drives for angle-setting, and multiply scanned angle circles; these are among a number of components which are necessary solely for manual operation or for geodetic uses, but they are not needed for measurements on industrial objects.

On the other hand, theodolites supply angular values which are usable only in a leveled state whereby to assure a vertical axis that is truly vertical. This, in its turn, greatly limits the usefulness of a theodolite system for the measurement of industrial objects.

Substantially greater precision of measurement is definitely required for industrial projects than in geodesy, since the dimensions of measured objects are to be determined with a precision of a few $\mu$m. The need for precision requires that, if possible, the relation in space between sensors used for measurement and the object itself being measured, shall not change during a measurement cycle and that this relation be retained in stable manner. With theodolites that are simply tripod-mounted alongside the object to be measured, this requirement can be satisfied only with great difficulty since the positional relationships between object and sensor change as a result of vibrations, temperature influences, etc.

EPO patent application Al-0 256 968 describes a method for non-contact measurement of large objects, using two video cameras which are mounted for selective rotation on each of two orthogonal axes. To determine coordinate values, the signals of these cameras are fed to a computer, along with orientation-angle data from transmitters associated with the respective axes of rotation. Aside from the fact that this EPO patent application does not disclose the construction of the two-axis rotary device, this EPO case does not have anything to say regarding the problem of fixing the positional relation between the measurement object and the sensor.

Finally, U.S. Pat. No. 4,226,536 describes a non-contact optically-operating measurement system, illustratively for measuring the contour of helicopter-rotor blades, in which two mark projectors and two electro-optical trackers are mounted on a common frame which is movable on rails so that optical intersects can be produced over the entire length of the object and measured by the triangulation principle.

This system also operates relatively slowly since electro-optical tracking of the projected light spot which is moved over the surface of the object must be accurate. Constant positional relationships between the measurement system, on the one hand, and the object to be measured, on the other hand, depend on the quality of the bearings and guides used for the displaceable frame and cannot be definitely maintained within the above-indicated measurement-precision range of a few $\mu$m.

BRIEF STATEMENT OF THE INVENTION

The object of the present invention is to provide a coordinate-measuring machine for non-contact measurement of objects, wherein the machine avoids the above-noted disadvantages of the prior art and, in particular, assures stable geometrical relationships between the object to be measured and the measurement system, during a measurement cycle.

The invention achieves this object by providing a measuring machine in which one or more motorized two-axis articulating heads, each mounting a camera, are mounted to a table which also mounts the object to be measured, and by providing the table with vibration damping.

In this way, a coordinate-measuring machine can operate without contacting the object to be measured, and operation is substantially unaffected by environmental influences. Furthermore, aside from the motor-driven two-axis head which provides articulated support for the camera, the machine has no moving parts, and even large objects with a large number of measurement points can be measured rapidly. Since the cameras and the workpiece are arranged together on a vibration-damped table, the positional relationship between them is retained with a high degree of precision. Accordingly, long measurement cycles can be obtained without recalibration of the system.

The new coordinate-measuring machine furthermore is of relatively simple construction since many parts can be used from existing tactile coordinate-measuring machines. Thus, for example, it is not necessary to provide an expensive theodolite as the camera support. Instead, it is possible to use a known two-axis articulating head which has previously been employed in tactile coordinate-measuring machines, for the replaceable mounting of universally orientable mechanical probes on the measurement arm of a coordinate-measuring machine. Such a head is described in U.S. Pat. No. 4,888,877. The vibration-damped workpiece table on which these camera-mounting articulating heads are arranged may also be the table of a known tactile coordinate-measuring machine, in which case, of course, precise machining of guide surfaces is not necessary since no moving parts need be guided on such a table.

It may even be advantageous to provide such articulating heads (with their angle transmitters) as accessory equipment on the table of a tactile coordinate-measuring machine. Such a combined measuring machine can then not only mechanically scan individual points on a workpiece but also at the same time optically determine a very large number of measurement points, depending on the desired measurement task. Detailed disclosure of such a combined machine is the subject of pending German patent application P 4026942.6, filed Sep. 25, 1990.

It is advisable for the two-axis articulating heads which support the cameras to be mounted on vertically adjustable columns. This makes it possible to adapt the measurement system to different geometries of the object and, in particular, to record horizontal optical intersects of a given workpiece at different heights.

It is furthermore advantageous for the cameras to be replaceably accommodated by suitable mounting to a special receiving plate of the articulating head, such that one and the same precisely located relationship can be repeatably established. Any of the cameras can then be easily replaced, as by a sighting-mark projector by means of which points are marked on smooth object surfaces.

It is also advisable to integrate a workpiece-supporting turntable into the table, for controlled and measured rotation of the object to be measured. This makes it possible, with a minimum number of at least two cameras, to perform a fully circumferential measured survey of the workpiece.

DETAILED DESCRIPTION OF THE INVENTION

Two embodiments of the invention will be described in detail, in conjunction with the accompanying drawings, in which:

FIG. 2 is a perspective view of a modified, second embodiment of the invention;

FIG. 6 is a block diagram of essential components of the coordinate-measuring machine of FIG. 1.

Figure 1:
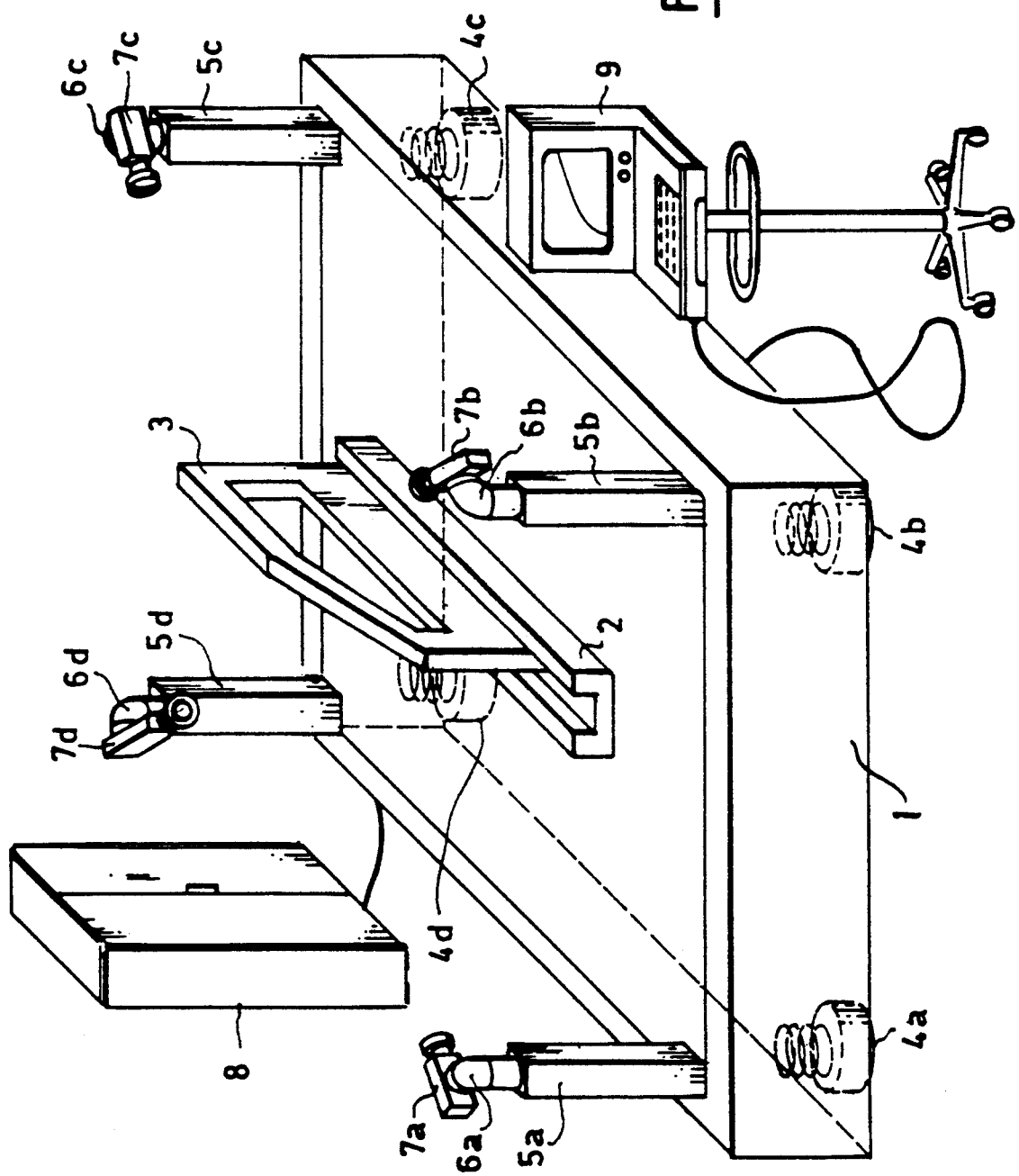
FIG. 1 is a perspective view of a non-contact coordinate-measuring machine of the invention.

The heart of the non-contact coordinate-measuring machine of FIG. 1 is a stable table (1), as of granite; and the table (1) is insulated from external conditions, being mounted on four vibration dampers (4a-d). A workpiece (3) to be measured is supported by mounting means (2) on the table (1).

Four rigid columns (5a-5d) are provided at the corners of the table (1). Each of these columns mounts a two-axis articulating head (6a-6d), having separate motor drives for each axis of articulation, and each of these heads is equipped with an angle-position transmitter for each of the two orthogonally related axes of the head. Construction detail for such articulating heads is provided in U.S. Pat. No. 4,888,877.

The articulating heads (6a-d) have no superfluous means for visual observation, nor need they be directed in accordance with the gravitational field of the earth. On the other hand, the exact position of each of the roughly vertically oriented axes of rotation of these four articulating heads (6a-d) need be established only once by calibration, and by recording the same in the computer of the coordinate-measuring machine.

Figure 3:
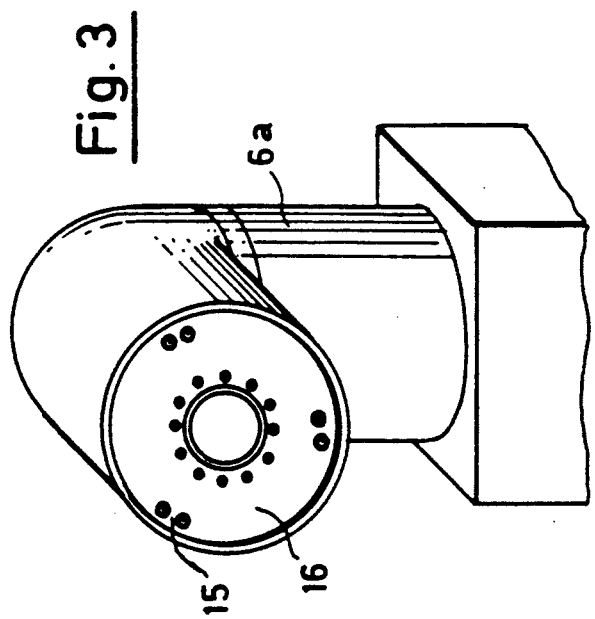
FIG. 3 is a perspective view of a two-axis articulating head in the embodiment of FIG. 1.
Figure 4:
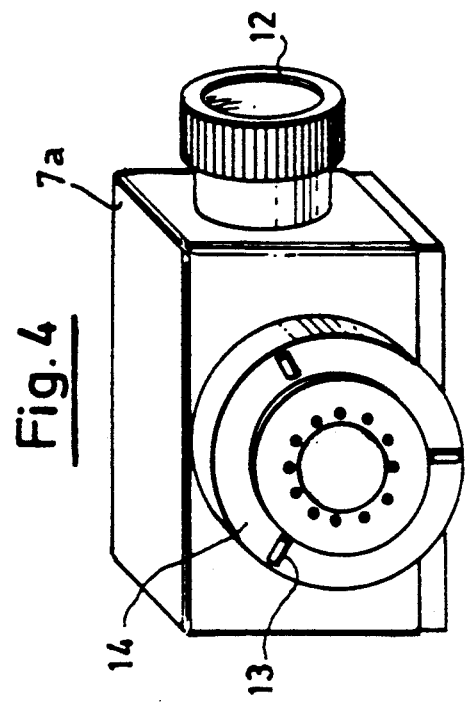
FIG. 4 is a perspective view of a camera in the embodiment of FIG. 1, looking at means for replaceably mounting the same.

As can be noted from the enlarged view of FIG. 3, the head (6a), which is illustrative for each of the articulating heads, has a receiving plate or chuck receptacle (16) which is provided with three locating detents (15) in the form of angularly spaced pairs of balls These detents (15) represent a three-point position-locating chucked support for a camera (7a-d) removably assembled thereto, wherein the assembled position of the camera is reproduced with great accuracy; in FIG. 4, it can be seen that a corresponding mount (14) having three radially oriented and angularly spaced cylindrical centering bodies (13) is provided on the camera housing, and it will be understood that each of the cylindrical bodies (13) has locating engagement with a different ball pair (15) of the articulating head (6a) to which it is assembled and securely retained by magnetic forces, as described in said U.S. patent.

Control means within a cabinet (8) provides signals for motor-driven rotation about each of the orthogonally related axes of each of the articulating heads (6a-d); at the same time, signal-processing means in this cabinet operates upon signals from the two angle-sensing transmitters of each of the articulating heads as part of the measurement-processing of angle values sensed by these transmitters. The cabinet (8) also contains the electronics for operating each camera (7a-d) and for processing and storing its video signal. And it will be understood that the correctly oriented mounting relation between each camera and its articulating head is assured by engagement of coacting contacts (not shown) on the exchange surface of the receiver (16) of the articulating head and on the change mount (14) of the camera that is removably assembled thereto, as described in said U.S. Pat. No. 4,888,877. Description of FIG. 1 is completed by identifying a movable input keyboard (9) which is connected to the control cabinet (8) and by which the coordinate-measuring machine can be operated.

Each of cameras (7a-d) of the coordinate-measuring machine of FIG. 1 can, therefore, be aligned by means of its articulating head, in all directions of space with respect to the optical axis of the camera objective (12), and it is further explained below that such universality of camera orientation permits complete non-contact measurement of the workpiece (3).

Figure 5:
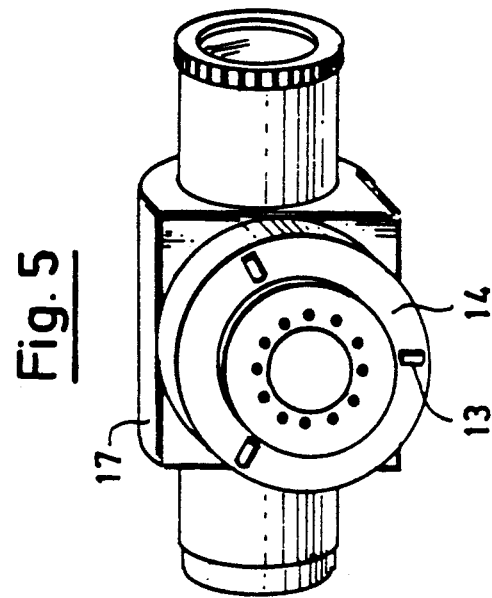
FIG. 5 is a perspective view of a mark projector which can be removably attached to the articulating head of FIG. 3, in place of the camera of FIG. 4.

It will be seen that the attachment-interface arrangement of the receiver (16) on each articulating head (6a-d) lends itself to selective removable attachment of other sensors or illuminating devices suitable for optical measurement of the workpiece (3). For example, instead of a camera, a target-marking projector (17), as shown in FIG. 5, has a mount (14) similar to that of the camera of FIG. 4, and the projector (17) can serve to project one or more light spots on unstructured regions of the object (3), the position of said light spots being then measured with one or more cameras, from suitably spaced column locations (5). The cameras (7a-d) can furthermore be replaced by fixed-focus cameras of different focal length or with different operating distances adapted to the object (3) to be measured. The receiver (16) also lends itself to selective attachment of means for illuminating the entire object (3). In every case, whether the mount (14) is on a camera (7a) or is on a mark projector (17), the arrangement is such that the axis of symmetry passes through the center of gravity of the involved machine, so that the machine is mounted without applying a rotational moment to the articulating head.

It is preferred that each of the cameras (7a-d) shall be of the variety having a so-called surface CCD array as its light-sensitive surface sensor. Such sensors typically obtain resolutions of about 500×500 image elements, and the image area of a sensor is generally less than 50 mm$^2$. This resolution is limited by the number of image elements and is as a rule insufficient for highly accurate measurements of industrial objects. It is therefore necessary to cover the object by several partial images and to establish the spatial position of the partial images in different angular positions of the articulating heads, the spatial position of the partial images being determined in a common coordinate system in which angular-position values supplied by the articulating heads (6a-d) are calculated in their different positions, along with the positional information supplied by the particular camera involved in the measurement point of interest in the image plane of the sensor. With a video camera image field of, for example, 2°×2°, it is therefore necessary for each articulating head to position its mounted camera within about 1°, and then, when at a standstill, to report the exact angular value to the computer of the coordinate-measuring machine.

The course of the measurement carried out with the coordinate-measurement machine of FIG. 1 can be best described in connection with the block diagram of FIG. 6, wherein (18) designates the control means by which the four articulating heads (6a-d) are so positioned, upon command by the CMM computer (10), that (for each measurement) their mounted cameras (7a-d) record in pairs, for object points of interest within the image field of their respective CCD sensors.

The video signals of the cameras (7a-d) are fed to an electronic image-processing system 11 with associated image-storage means (29). Several images which correspond to the different angular positions of the camera can be stored for each video camera in the image-storage means (29).

During a measurement cycle, the object surface is completely recorded, for different angular positions of the cameras; the recorded images are stored in the image-storage means (29); and, thereupon, the object details of interest, such as edges, marks, etc. which occur simultaneously in the images of two different cameras are picked out in the image-coordinate system of the sensor of the corresponding camera. These position-measurement values, which are supplied by the cameras, are transmitted to the computer (10) of the coordinate-measurement machine. At the same time, the computer (10) receives, from the means (18) of control of the four articulating heads (6a-d) the angular-measurement values which correspond to the orientations of the cameras at the time of recording the image; in FIG. 6, the symbolism ($\theta_1-\theta_4$) will be understood to indicate angle control and positional feedback for one of the rotary axes of each articulating head, while the symbolism ($\phi_1-\phi_4$) indicates similar functions for the second rotary axis of each articulating head. These angle-measurement values, together with the position of the optical axis of the objective (12) of each camera give the orientation of the image-coordinate system in the coordinate system which is common to the entire apparatus. The computer is therefore able, with algorithms of three-dimensional intersect (triangulation) known from photogrammetry, to unambiguously calculate the coordinates of each measured point on the object, using (i) the measured-angle values, (ii) stored calibration data, and (iii) measurement data delivered by the image-processing device.

This foregoing calculation takes into account such calibration data as the exact installed position of each of the four articulating heads, as well as the orthogonality of the two rotary axes of the same articulating head. These calibration data need be determined only once, for each of the four articulating heads, and the data are stored in means (19) of calibration storage, associated with the CMM computer (10). The storage means (19) will be understood furthermore to contain calibration data for each of the four video cameras (7a-d); such data include geometrical deviations of the sensor, as well as the distortion of the objective (12) of each of the video cameras.

An output unit (20) is provided for the outputting of calculated object coordinates, with due consideration of the calibration data from storage means (19).

The measurement of a complete workpiece can be effected "all at once" with image memories which are dimensioned correspondingly large, by first recording all measurement points of interest and storing the partial images for the measurement points of interest. The calculation process necessary for evaluation of the images can then take place while the next workpiece to be measured is already in place on the table (1) of the coordinate-measuring machine. In the event of limited image storage capacity, or large objects which must be broken down into a plurality of partial images, the calculation process for the evaluation will take place in parallel with or intermittently with respect to actually making measurements of the object. It is then particularly important that the spatial arrangement between the workpiece and the position of the axes of rotation of the articulating heads (6a-d) be accurately retained. This is assured by the described stable construction. The same consideration also applies to the fidelity of reproducible attachment of the video cameras (7a-d) to the receivers (16) of the articulating heads (6a-d). After replacement, they must again assume their position with high accuracy if a time-consuming recalibration of the camera positions is to be avoided.

FIG. 2 shows a slightly modified embodiment of the coordinate-measuring machine of the invention. Identical parts such as the table, the control cabinet, the keyboard and vibration dampers are provided with reference numbers which are greater by 20 than those given in FIG. 1, so that their further description is not needed. On the other hand, as distinguished from the embodiment of FIG. 1, only two cameras (27a and 27b) are used, being mounted in spaced relation on one side of the table (21) of FIG. 2. The full circumferential span of measurement aspects of an object or workpiece (23) is obtained by mounting the same on a turntable (22), which is mounted to the workpiece table 21, for rotation about a vertical axis. The cameras (27a and 27b) and the rotary/pivot joints (26a and 26b) which angularly position these cameras are mounted for selective vertical adjustability to telescopically movable parts (28a and 28b) of columns (25a and 25b). Additionally, between the two columns (25a and 25b), a third column (25c) is fixed to the table (21), and its telescopic extension (28c) mounts an articulating head (26c), with an attached mark projector (17).

The mark projector (17) serves to mark selected points on the surface of the object (23) by means of a laser spot, the marked places then being sighted and measured simultaneously by the two cameras (27a and 27b).

Still further, FIG. 2 shows three spaced calibrating bodies (29a, 29b and 29c), arranged on table (21), each of these bodies comprising a ball at the top of an upstanding column. These calibrating bodies serve, in intervals during which the workpiece (23) is changed, to recalibrate the position of the cameras (27a and 27b) by an optical resection; in this connection, a newly recalibrated determination is made for the distance (a) between camera supports, as well as for the telescopically adjusted heights ($b_1$ and $b_2$) of the respective points of intersection of the two axes of rotation of each of the articulating heads (26a and 26b).

The circuit construction of the coordinate-measuring machine of FIG. 2 corresponds essentially to that shown in FIG. 6 for the machine of FIG. 1, with the difference that the CMM computer additionally takes into account the angular values supplied by the turntable (22), in the calculation of measurement-point coordinates. To this end, the articulating head (6d) and its video camera (7d) may be deemed to be replaced by the turntable 22, namely, drive means and angle-sensing means for tracking instantaneous rotary position of the turntable, with suitable connections to control means 18.

What is claimed is:

1. A coordinate-measuring machine for the contactless measurement of objects, wherein a plurality of cameras (7;27) are mounted to motor-driven articulating heads with angular-position transmitters (6;26) for each of two orthogonal axes of joint articulation and are arranged a distance apart from each other alongside the object, and wherein the cameras produce video signals which, together with angular-position output data of the transmitters (7;27), are fed to a computer (10) for determination of the coordinate values of measurement points, said coordinate-measuring machine having an image-processing device (11) with associated storage means (29) having capacity to store a plurality of images for each of the cameras (7a-c), the motor-driven articulating heads (6;26) being installed with the cameras (7;27) on a table (1;21) which is adapted for supporting an object (3;23) to be measured, and vibration-damping means (4;24) for said table.

2. A coordinate-measuring machine according to claim 1, wherein the articulating heads (26) are mounted on individual vertically adjustable columns (28) that are fixed to said table.

3. A coordinate-measuring machine according to claim 1, wherein each of the articulating heads (6) has a mount-receiving plate (16) and each of said cameras (7) is provided with a suitable mount (14) and is replaceably mounted to a mount-receiving plate (16) of a different one of the articulating heads (6).

4. A coordinate-measuring machine according to claim 3, wherein one or more sighting-mark projectors (17) are provided with a suitable mount (14) which can be replaceably mounted instead of a camera (7a) to the mount-receiving plate (16).

5. A coordinate-measuring machine according to claim 1, wherein a turntable (22) is integrated in the workpiece table (21) for rotation about a vertical axis with measurement means for sensing instantaneous rotary position of the turntable about such axis, and sensed rotary-position data of the measurement means are also fed to the computer (10).

6. A coordinate-measuring machine according to claim 1, wherein a plurality of calibrating bodies (29a-c) are arranged on the table (21) in the image field of the cameras (26a, b).

7. A coordinate-measuring machine according to claim 1, wherein the computer (10) has means (19) for storage of calibration values descriptive of axis location of the articulating heads (6a-c) and of the optical-axis location of the cameras (7a-c).

8. A computer-operated multiple-coordinate measuring machine for non-contact measurement of a workpiece comprising a stable rigid horizontal table with vibration-damping means for mounting said table in isolation from external mechanical shock, means on said table for mounting a workpiece to be measured, a plurality of articulating heads mounted to spaced locations on said table; each articulating head comprising (i) a first or base member fixedly mounted to said table and establishing a first generally vertical axis of rotation, (ii) a second or intermediate member mounted to said base member for motor-driven rotary positioning about said first and establishing a second axis of rotation that is orthogonal to said first axis and therefor contained in a generally horizontal plane, (iii) a third or article-chucking member mounted to said intermediate member for motor-driven rotary positioning about said second axis, and (iv) angle-measuring means associated with each axis of rotation for generating separate electrical signals indicative of instantaneous angular position (a) of said second member about said first axis and (b) of said third member about said second axis; a video camera chuck-mounted to each article-chucking member such that the optical axis of the camera is orthogonal to said second axis; and computer means connected to control motor-driven rotary positioning about said axes and to receive electrical signals from said angle-measuring means and from said video cameras for use of said signals to computer coordinates of triangulating video-camera sightings on measurement points of the workpiece, said computer means including an image-analysis device with associated storage means having capacity to store a plurality of images for each of said video cameras.

9. The machine of claim 8, in which a further such articulating head is mounted to said table in spaced relation to two of said articulating heads, and an optical-mark projector having an optical axis of projection, said optical-mark projector being chuck-mounted to the third member of said further articulating head such that the optical-projection axis thereof is orthogonal to the second axis of rotation of said further articulating head, said computer means being additionally connected to control motor-driven rotary positioning about the first and second axes of said further articulating head and to receive electrical signals from the angle-measuring means of said further articulating head.

10. The machine of claim 8, in which the means on said table for mounting the workpiece is a turntable mounted for motor-driven rotary positioning about a vertical axis, angle-measuring means associated with the vertical axis of turntable rotation for generating electrical signals indicative of instantaneous angular position of said turntable, said computer means being additionally connected to control motor-driven turntable rotation and to receive electrical signals from the angle-measuring means associated with the axis of turntable rotation.

11. The machine of claim 8, in which said table establishes a flat rectangular horizontal surface of workpiece support, and said articulating heads are mounted at the four corners of said surface, with intersections of orthogonally related axes positioned above said surface.

12. The machine of claim 11, in which the base member of each articulating head is mounted to an upstanding pedestal at a corner of said surface.

13. The machine of claim 12, in which the height of each upstanding pedestal is adjustable.

14. A computer-operated multiple-coordinate machine for non-contact measurement of a workpiece comprising a stable rigid horizontal table with vibration-damping means for mounting the same in isolation from external mechanical shock, means on said table for mounting a workpiece to be measured, a plurality of video cameras mounted to spaced parts of said table for selective rotary articulation of the optical axis of each camera about two orthogonally related axes which intersect above said table, a separate motor drive for articulation about each of the orthogonally related axes, angle-measuring means associated with each of said orthogonally related axes for generating separate electrical signals indicative of instantaneous angle of relative rotation about each of said orthogonally related axes, and computer means connected to control motor-driven rotary positioning about said orthogonally related axes and to receive electrical signals from said angle-measuring means and from said video cameras for use of said signals to compute coordinates of triangulating video-camera sightings on measurement points on the workpiece, said computer means including an image-analysis device with associated storage means having capacity to store a plurality of images for each of said video cameras.

15. The machine of claim 14, in which the means on said table for mounting the workpiece is a turntable mounted for motor-driven rotary positioning about a vertical axis, angle-measuring means associated with the vertical axis of turntable rotation for generating electrical signals indicative of instantaneous angular position of said turntable, said computer means being additionally connected to control motor-driven turntable rotation and to receive electrical signals from the angle-measuring means associated with the axis of turntable rotation.

16. A computer-operated multiple-coordinate machine for non-contact measurement of a workpiece comprising a stable rigid horizontal table with vibration-damping for mounting the same in isolation from external mechanical shock, means on said table for mounting a workpiece to be measured, a video camera and an optical-mark projector mounted to spaced parts of said table for selective rotary articulation of the respective optical axes of said video camera and of said optical-mark projector about two orthogonally related axes which intersect above said table, a separate motor drive for articulation about each of the orthogonally related axes, angle-measuring means associated with each of said orthogonally related axes for generating separate electrical signals indicative of instantaneous angle of relative rotation about each of said orthogonally related axes, and computer means connected to control motor-driven rotary positioning about said orthogonally related axes and to receive electrical signals from said angle-measuring means and from said video camera for use of said signals to computer coordinates of video-camera sightings on measurement points marked on the workpiece by said optical-mark projector, said computer means including an image-analysis device with associated storage means having capacity to store a plurality of images for each of said video cameras.

17. The machine of claim 16, in which the means on said table for mounting the workpiece is a turntable mounted for motor-driven rotary positioning about a vertical axis, angle-measuring means associated with the vertical axis of turntable rotation for generating electrical signals indicative of instantaneous angular position of said turntable, said computer means being additionally connected to control motor-driven turntable rotation and to receive electrical signals from the angle-measuring means associated with the axis of turntable rotation.

18. The machine of claim 17, in which said video camera and said optical-mark projector are interchangeably mounted to said spaced parts of said table.

19. The machine of claim 8, in which said video camera is one of a plurality of video cameras of different focal length, and in which all of said video cameras have like mounting formations for interchangeable chuck-mounting to each article-chucking member.

20. A computer-operated multiple-coordinate measuring machine for non-contact measurement of a workpiece comprising a stable rigid horizontal table with vibration-damping means for mounting said table in isolation from external mechanical shock, means on said table for mounting a workpiece to be measured, and a plurality of articulating heads mounted to spaced locations on said table; each articulating head comprising (i) a first or base member fixedly mounted to said table and establishing a first generally vertical axis of rotation, (ii) a second or intermediate member mounted to said base member for motor-driven rotary positioning about said first axis and establishing a second axis of rotation that is orthogonal to said first axis and therefore contained in a generally horizontal plane, (iii) a third or article-chucking member mounted to said intermediate member for motor-driven rotary positioning about said second axis, and (iv) angle-measuring means associated with each axis of rotation for generating separate electrical signals indicative of instantaneous angular position (a) of said second member about said first axis and (b) of said third member about said second axis; a video camera chuck-mounted to each article-chucking member such that the optical axis of the camera is orthogonal to said second axis; and computer means connected to control motor-driven rotary positioning about said axes and to receive electrical signals from said angle-measuring means and from said video cameras for use of said signals to computer coordinates of triangulating video-camera sightings on measurement points of the workpiece; said computer means including control means connected to said articulating heads and providing two angular-coordinate signal values ($\theta$, $\phi$) for each of said articulating heads, and image-analysis means including image-storing means connected to the output of each video camera for providing image-coordinate position-measurement values, said computer means being connected to said control means and to said image-analysis means for combining said angular-coordinate signal values and said image-coordinate position-measurement values and for calculating three-dimensional object coordinates from said values.

21. The method of using a computer-operated multiple-coordinate measurement machine (CMM) for non-contact three-dimensional measurement of one or more of a succession of workpieces, wherein (a) the CMM comprises a plurality of like articulating heads at fixed spacing, (b) each articulating head having two orthogonally related axes of rotation with sensors to report instantaneous angular positions about said axes, (c) a video camera for creating images of the workpiece and mounted to each of the articulating heads for two-axis rotary positioning, and (d) an image-analysis device with associated storage having capacity to store a plurality of images for each of the video cameras, said method comprising the steps of:
 (i) recording at least a desired surface of the workpiece, for different angular positions of at least two of the cameras, and storing the images;
 (ii) analyzing the images for recorded features which occur simultaneously in the images of the at least two different cameras, and developing image coordinates for at least one recorded feature for images of the two cameras; and
 (iii) calculating, from the developed image coordinates and from articulating-head sensor-reported angular-position data, the three-dimensional position coordinates of said at least one feature.

22. The method of claim 21, in which the CMM has provision for stored calibration data including calibration data for coordination of camera viewing-axis orientation as a function of two-axis angular position for each of the articulating heads, as well as an exact installed position for each of the articulating heads, and the stored calibration data are taken into account in the calculation of step (iii).

23. The method of claim 22, in which each camera has an objective lens and the stored calibration data include, for each camera, geometrical deviations of the sensors, as well as image distortion by the objective lens of each camera.

24. The method of claim 21, in which a measurement of the complete workpiece is accomplished by using the video cameras to record all measurement points of interest and by storing only partial images for measurement points of interest.

25. The method of claim 24, in which the calculation process for stored data for a first workpiece is coordinated to take place during an interval in which a measured workpiece is being removed and replaced by a succeeding workpiece to be measured.

* * * * *